(No Model.)

A. QUINQUE.
CRIBBING PLATE.

No. 287,577. Patented Oct. 30, 1883.

WITNESSES:
Otto Beyer
C. Sedgwick

INVENTOR:
A. Quinque
BY Munn & Co.
ATTORNEYS.

UNITED STATES PATENT OFFICE.

AUGUST QUINQUE, OF HARLEYSVILLE, PENNSYLVANIA, ASSIGNOR TO HIMSELF AND J. REINHART Z. KEELOR, OF SAME PLACE.

CRIBBING-PLATE.

SPECIFICATION forming part of Letters Patent No. 287,577, dated October 30, 1883.

Application filed August 29, 1883. (No model.)

*To all whom it may concern:*

Be it known that I, AUGUST QUINQUE, of Harleysville, in the county of Montgomery and State of Pennsylvania, have invented a new and Improved Cribbing-Plate, of which the following is a full, clear, and exact description.

This invention seeks to provide a practical device, to be placed upon horses' teeth, to prevent or cure them from cribbing; and to this end the invention consists of the construction, arrangement, and combination of parts, all as hereinafter described and claimed.

Reference is to be had to the accompanying drawings, forming part of this specification, in which similar letters of reference indicate corresponding parts in both the figures.

Figure 1:
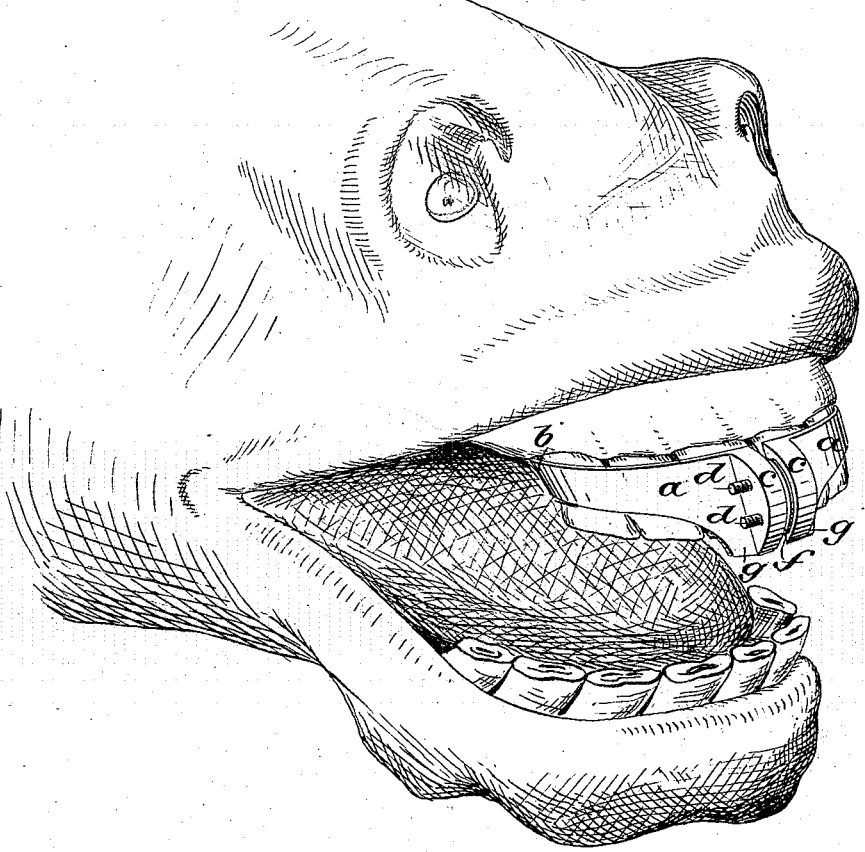
Figure 2:
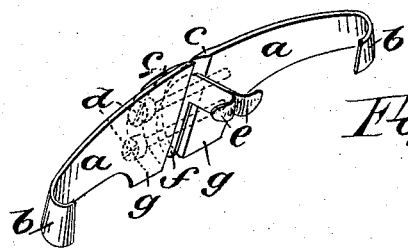

Figure 1 is a perspective view, showing the method of applying my new cribbing-plate; and Fig. 2 is a full perspective view of the cribbing-plate.

$a\ a$ represent two slightly-curved plates, of steel. At their outer ends these plates are formed with the loops or hooks $b\ b$, which are adapted to hook over the teeth of the horse, as shown in Fig. 1. At their adjacent ends the plates $a\ a$ are formed with the corresponding lugs, $c\ c$, through which the screws $d\ d$ pass for drawing the plates $a\ a$ together for causing the hooks $b\ b$ to grasp the teeth of the horse.

Upon the screws $d\ d$, between the adjacent ends of the plates $a\ a$, is placed the staple-plate $f$, which is formed with the arms $e\ e$, that are adapted to be passed between the two front teeth of the horse, and to be clinched against the back of the horse's teeth for holding the device in the center.

At $g\ g$ the plates $a\ a$ are made of considerable width, so that when in place they project below the horse's teeth in front, as shown in Fig. 1, so that when the horse brings his teeth in contact with any object in the attempt to crib, the device will be forced upward against his gums and cause pain, and thus effectually prevent and ultimately cure him from cribbing.

Constructed in this manner it will be seen that the device may be very easily applied to the horse's teeth without boring or otherwise injuring the teeth, and as easily removed, and that it will not make the horse's mouth sore, as the device comes against the flesh only at the moment of attempting to crib, and that by means of the screws $d\ d$ the device may be adjusted to fit any horse's mouth.

Having thus fully described my invention, I claim as new and desire to secure by Letters Patent—

1. The cribbing-plate herein shown and described, consisting of the hooked plates $a\ a$, and the central fastening-plate, $f$, the plates $a\ a$ being adapted to be drawn together by screws, substantially as and for the purposes set forth.

2. The combination, with the curved plates $a\ a$, of the staple-plate $f$, held between the adjacent ends of the said plates by the clamping-screws $d\ d$, and provided with the arms $e\ e$, substantially as herein shown and described, and for the purpose set forth.

3. The plates $a\ a$, provided with the hooks $b$, the lugs $c$, and the projections $g$, in combination with the screws $d$ and the staple-plate $f$, substantially as herein shown and described.

AUGUST QUINQUE.

Witnesses:
SOLOMON SNYDER,
J. REINHART KEELOR.